(12) United States Patent
Jäger et al.

(10) Patent No.: US 10,723,556 B1
(45) Date of Patent: Jul. 28, 2020

(54) PICK-UP WEB FOR AN AGRICULTURAL MACHINE, IN PARTICULAR, A NUT HARVESTER

(71) Applicant: Arnold Jäger Holding GmbH, Hannover (DE)

(72) Inventors: Sebastian Jäger, Hannover (DE); Jessica Tamra Reed, Sandstone, MN (US)

(73) Assignee: ARNOLD JÄGER HOLDING GMBH, Hannover (DE)

( * ) Notice: Subject to any disclaimer, the term of this patent is extended or adjusted under 35 U.S.C. 154(b) by 0 days.

(21) Appl. No.: 16/408,069

(22) Filed: May 9, 2019

(51) Int. Cl.
*B65G 15/52* (2006.01)
*A01D 17/10* (2006.01)
*B65G 15/34* (2006.01)
*B65G 17/42* (2006.01)
*B65G 15/54* (2006.01)
*A01D 33/08* (2006.01)

(52) U.S. Cl.
CPC ............ *B65G 15/52* (2013.01); *A01D 17/101* (2013.01); *A01D 33/08* (2013.01); *B65G 15/34* (2013.01); *B65G 15/54* (2013.01); *B65G 17/42* (2013.01); *A01D 2017/103* (2013.01); *A01D 2017/108* (2013.01); *B65G 2201/0211* (2013.01)

(58) Field of Classification Search
CPC ...... B65G 15/54; B65G 17/42; B65G 17/083; B65G 19/24; B65G 19/245; B65G 17/064; B65G 2201/0211; B65G 15/34; B65G 15/52; A01D 17/101; A01D 33/08; A01D 2017/103; A01D 2017/108
USPC ................. 198/850–853, 817, 848
See application file for complete search history.

(56) References Cited

U.S. PATENT DOCUMENTS

| | | | | |
|---|---|---|---|---|
| 2,649,954 | A * | 8/1953 | Nawman | B65G 17/064 198/683 |
| 3,679,050 | A * | 7/1972 | Anderson | A01D 17/10 198/699.1 |
| 4,582,193 | A * | 4/1986 | Larsson | B65G 17/067 198/853 |
| 4,653,632 | A * | 3/1987 | Timmer | A01D 17/10 198/822 |
| 6,811,021 | B1 * | 11/2004 | Corley | B65G 17/086 198/690.2 |
| 7,182,202 | B2 * | 2/2007 | Kalverkamp | B65G 17/02 198/844.1 |
| 2005/0103606 | A1 * | 5/2005 | Hartness | B65G 17/323 198/850 |
| 2015/0344228 | A1 * | 12/2015 | Westergaard Andersen | B65G 17/08 198/836.1 |

* cited by examiner

*Primary Examiner* — James R Bidwell
(74) *Attorney, Agent, or Firm* — Vedder Price P.C.

(57) ABSTRACT

A pick-up web for an agricultural machine, in particular, for picking up and transporting nut fruit in a nut harvester along a conveyor device. The pick-up web comprising at least two endless circulating belts for driving the pick-up web and several rods extending perpendicular to the direction of transport of the pick-up web creating a sieve-type transport surface. The pick-up web further comprising several tappets and sweeping teeth each projecting perpendicularly away from the sieve-type transport surface.

11 Claims, 2 Drawing Sheets

PICK-UP WEB FOR AN AGRICULTURAL MACHINE, IN PARTICULAR, A NUT HARVESTER

Figure 1:
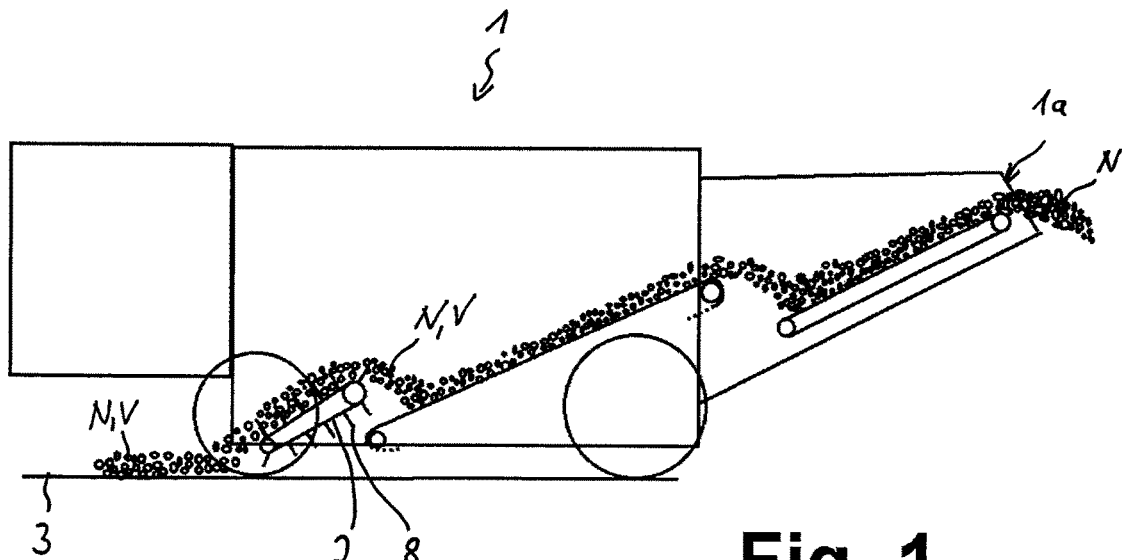

The invention relates to a pick-up web for an agricultural machine, in particular, for picking up and transporting nut fruit in a nut harvester.

Nut harvesters usually comprise several conveyor belts on which nut fruit are being transported inside the harvester towards a discharge device via which the nut fruit can be fed into a loading container on a trailer. The conveyor belts, besides transporting the nut fruit, have the task of cleaning the picked-up nut fruit. To that end, conventionally, rod belts are used as conveyor belts consisting of rods extending perpendicular to the direction of transport and parallel to each other, with the rods being spaced apart at a certain graduation thereby creating a transport surface. Any dirt picked up together with the nut fruit can be discharged through the so created slots between the rods. Thus, the conveyor belt acts as a sieve with a defined sieve surface determined by the graduation of the rods.

The rods are laterally mounted at their ends on continuously rotating outer belts via which the conveyor belt can be driven. By way of support or stabilization respectively, the rods may also be affixed to further rotating inner belts at their center or, depending on their length, at a certain graduation.

For the purpose of picking up the nut fruit from a ground, a so-called pick-up web is provided as the first conveyor belt in the chain of conveyance which serves, besides the above-described function of transporting and cleaning, to pick up the numerous nut fruit lying loosely on the ground and subsequently feed them to the next conveyor belt in the conveyance line. To the end, the pick-up web comprises, in addition to the above-described rods for creating a defined sieve surface, several tappets projecting off of the transport surface of the conveyor belt in an approximately perpendicular direction. The tappets are arranged at equal tappet distances from each other and extend parallel to the rods, whereby the tappets are spaced apart at a different graduation as the rods. For example, between five and seven rods may be provided between two tappets.

Each tappet is affixed to the endless circulating belts via a metal fixing bracket and exhibits, across the entire width of the conveyor belt, sweeping teeth projecting from the transport surface in an approximately perpendicular direction and distributed equally over the length of the tappet. Adjacent thereto, at each tappet a sweeping belt made of fabric reinforced rubber projecting perpendicularly from the transport surface and extending beyond the sweeping teeth. The Sweeping belt is gashed at regular intervals so as to create a segmented sweeping section.

The sweeping teeth are embedded in a rubber corpus extending across the entire width of the tappet. The lower part of the sweeping belt is in planar contact with this rubber corpus so that there is a two-layer construction consisting of the rubber corpus (including the sweeping teeth) and the sweeping belt or, respectively, the segmented sweeping section. Both layers are clamped in between a bar of the metal fixing bracket, projecting perpendicularly away from the transport surface, and a metal stop. To that end, screw connections run at regular intervals across the entire width of the pick-up web or, respectively, across the length of the tappets between the bar and the metal stop which connections completely penetrate the layer construction so that the rubber corpus and the sweeping belt are clamped in.

Hereby, it is a disadvantage that the individual layers of the layer construction are usually quite broad in order to lastingly withstand the operational loads and allow easy production. Thus, the tappets already occupy a large part of the transport surface and, therewith, the sieve surface of the pick-up web, and this compromises the overall cleaning process. Moreover, it is difficult to adjust the graduation of the tappets and the rods due to the width of the tappets or, respectively, the defined thicknesses of the individual layers and the tightly defined tolerances of the rod graduation. This leads to the tappets unnecessarily covering many further gashes between the rods allowing debris to deposit which further compromises the cleaning process.

Also, by virtue of the layer construction of the tappets, debris may accumulate between the basic corpus of the sweeping teeth and the gashed sweeping belt when such debris reaches the planar region in between. Consequently, an optimum pick-up of nut fruit in the normal operation cannot be guaranteed. Moreover, owing to the layers to be assembled, a tappet is expensive to produce and comprises a plurality of fastening means serving to maintain integrity of the layer construction tappet, and this markedly increases the weight of a tappet and the overall pick-up web.

Therefore, based on this, it is the object of the invention to provide a pick-up web for an agricultural machine, in particular, a nut harvester, which can be produced with little assembly effort and cost while safeguarding a secure operation.

This task is solved by a pick-up web according to claim 1. Preferred further developments are specified in the subclaims.

Thus, according to the invention, each tappet projecting away from the transport surface of a pick-up web comprises a one-piece basic corpus extending across the length of a tappet and into which sweeping teeth and a tappet fortification are being embedded, at least in part, in a spaced-apart manner, whereby the one-piece basic corpus is affixed via a mounting flange of the tappet fortification directly or indirectly to the at least two endless rotating belts, e.g. cam belts or flat belts, of the pick-up web, and a posterior edge of the basic corpus projects beyond the sweeping teeth as a sweeping section.

Thus, advantageously, a pick-up web for picking up and transporting nut fruit is provided the tappets of which are designed to be simple by virtue of their basic corpus being constructed as one piece. Consequently, all relevant functional elements, i.e. the sweeping teeth, the posterior flange as a band-shaped sweeping section, as well as the mounting flange, are embedded or, respectively integrated in the enclosed basic corpus. This simplifies not only the production of a tappet but also reduces the effort of assembling and the cost of assembling for mounting the tappet on the pick-up web.

Moreover, weight can be reduced since there is only one basic corpus requiring no layer by layer screwing connections as is the case in the state of the art. Moreover, such a basic corpus can be adapted easily to a rod graduation of the rods of the pick-up web creating the der transport surface. Thus, the width of the basic corpus can be specifically adjusted in such a way that the sieve surface of the conveyor belt is optimized, i.e. completely circulating the gaps between the rods are covered by the tappets as little as possible. This markedly optimizes the cleaning and transport process.

Preferably, it is provided that the rods are arranged individually or in groups, in particular, in pairs, i.e. in a twin rod configuration, or in groups of three or, respectively, triplets, i.e. in a triple rod configuration, always at the rod spacing in relation to each other between the at least two belts and affixed thereto via fastening means. This has been described, for example, in the document U.S. Pat. No. 9,033,138 B2 which is hereby incorporated into the application in total by reference. Therefore, the rod graduation may be optimally adjusted e.g. in the case of a cam belt thereby optimizing the sieve surface. Hereby, at least two endless circulating outer belts, preferably, fiber-reinforced rubber belts, are provided as belts between which the rods and the tappets are arranged and affixed at their ends in a suitable manner. Depending on the length of the rods or, respectively, width of the pick-up web, further, at least one endless circulating inner belt may be provided at a certain graduation between the outer belt and running in parallel therewith, with the rods and/or the tappets also being affixed to that inner belt. This can lead to a higher degree of stability in the case of long rods or, respectively, tappets.

Preferably, the tappet fortification embedded in the basic corpus is constructed as a fixing bracket, whereby the fixing bracket comprises a rod protruding into the basic and a mounting flange, whereby the mounting flange is flush with a contact surface of the tappet, whereby the tappet, at its contact surface, is in contact with the at least two belts. This can guarantee a more efficient fortification of the tappet while, by virtue of the angular shape, a reinforcing connection of the tappet with the belts via the mounting flange can be attained also. To that end, preferably, several holes are provided in the tappets penetrating at least the mounting flange, whereby the tappet is affixed to the at least two belts via fastening means introduced in the holes. Thus, a reliable and durable connection between the tappets and the belts can be created.

Furthermore, it is provided for the posterior flange of the basic corpus being gashed in segments as a sweeping section, and this may lead to an optimized sweeping action of the pick-up web because the sweeping sections can adapt, segment by segment, to the ground on which the nut fruit to be picked up are lying.

A polymer, preferably rubber, is chosen as the material of the basic corpus so as to allow for a simple and cost-effective production with little weight. Hereby, preferably, it is provided for the posterior flange of the basic corpus as sweeping section is additionally fiber reinforced. This can additionally help to protect this band-shaped sweeping section, being a region under particular load, from accelerated wear and tear, allowing an increased lifespan of the pick-up web.

The tappet fortification embedded in the basic corpus and/or die sweeping teeth embedded in the basic corpus are preferably made of metal so as to allow a more efficient reinforcement or, respectively, a more efficient pick-up action.

Figure 2:
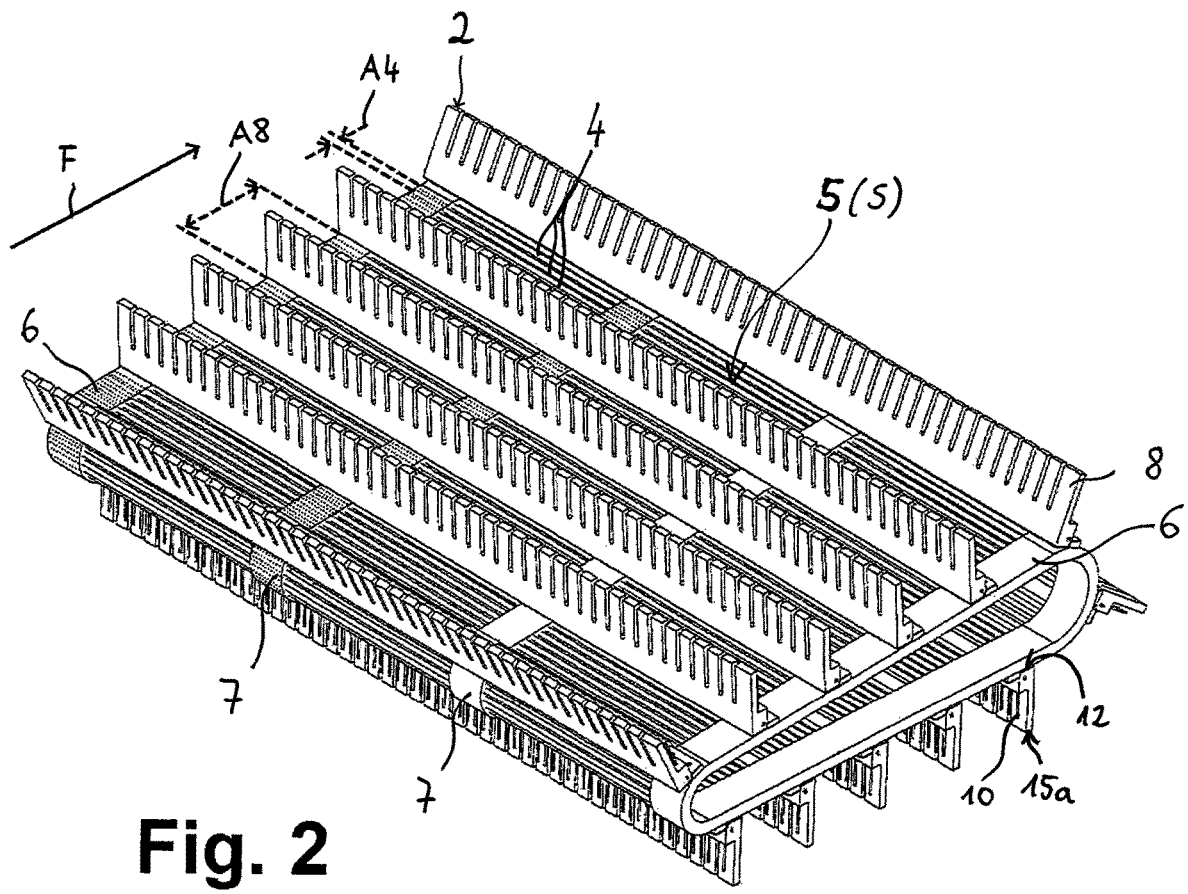
Figures 3, 4:
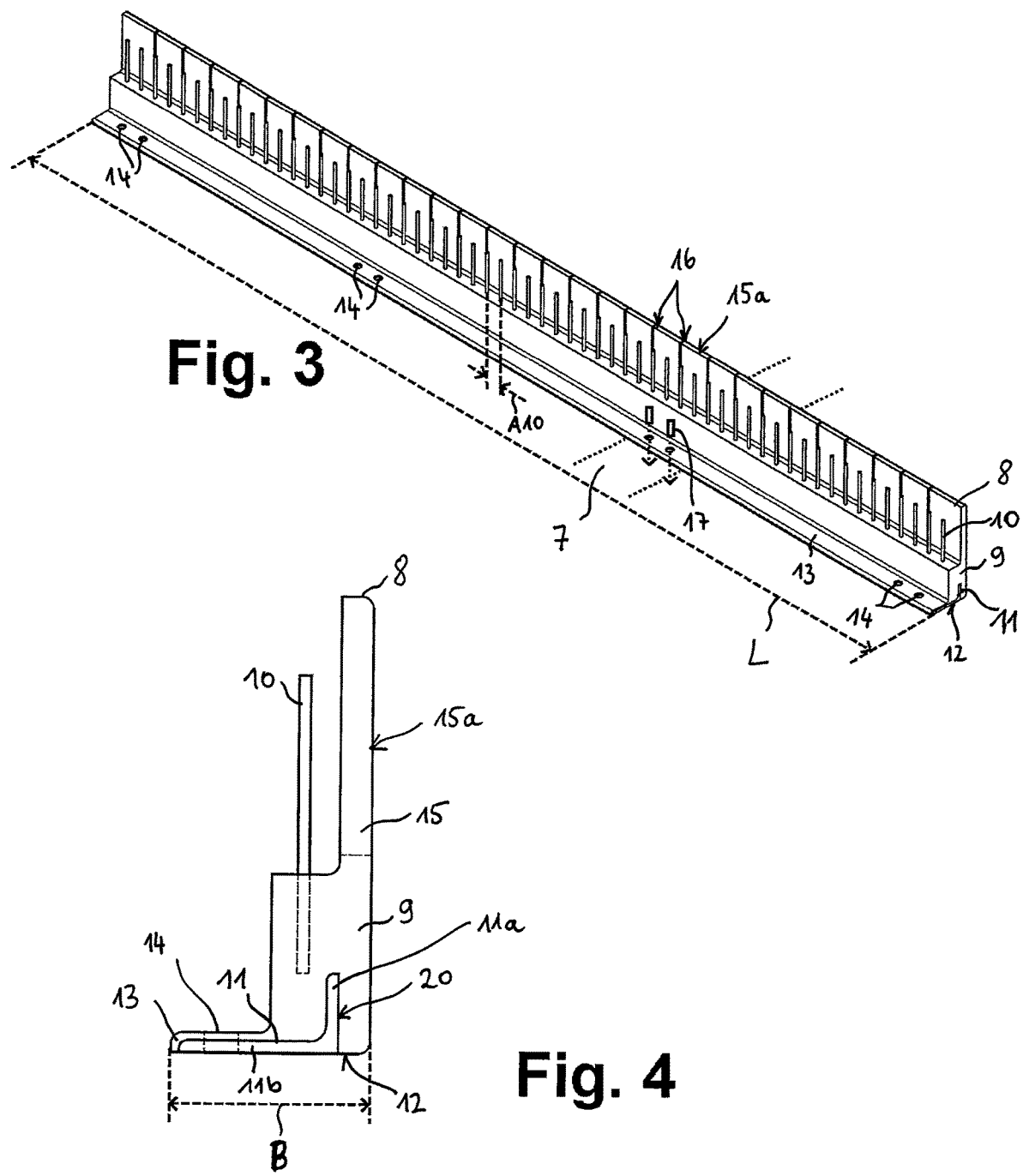

The invention is subsequently illustrated further by means of drawings. These show in:

FIG. 1 a nut harvester in a schematic view;

FIG. 2 a pick-up web in a perspective view;

FIG. 3 a detailed view of a tappet of the pick-up web according to FIG. 2; and

FIG. 4 a sectional view of the tappet des according to FIG. 3.

FIG. 1 shows schematically a nut harvester 1 comprising several conveyor belts transporting nut fruit N within the nut harvester 1 towards a discharge means 1a. A pick-up web 2 is provided as the first conveyor belt in the chain of transport, and the pick-up web can lead to nut fruit N lying on a ground 3 are being fed into the nut harvester 1. Together with the nut fruit N, dirt V will also be moved into the nut harvester 1, which dirt, however, due to the special design of individual or all conveyor belts as rod conveyor, can be partly discharged again. The pick-up web 2, too, is constructed as such a rod conveyor the operation of which is further illustrated by means of the further FIGS. 2, 3, and 4.

According to FIG. 2, the pick-up web 2 as a rod conveyor comprises several rods 4 evenly spaced apart at a certain rod spacing A4 so as to attain a certain rod graduation. The gaps between the individual rods 4 are dimensioned such that introduced dirt V can be discharged while the nut fruit N remain on the transport surface 5 created by the rods 4 and can be transported along a direction of transport F. Hereby, a sieve effect can be attained when operating the pick-up web 2 which is determined by the sieve surface S defined by the rod graduation. Dirt V van be discharged through the sieve surface S.

The rods 4 extend perpendicular to the direction of transport F always between two outer endless circulating belts 6 via which the pick-up web 2 is driven. To that end, the outer belts 6 can be constructed as cam belts or a flat belts which can be driven, in a known manner, by drives not shown here and, for that purpose, run on corresponding diversion or, respectively, drive wheels. The ends of the rods 4 are affixed to the outer belts 6, for example, via rivets or similar fastening means (indicated by a dotted line for one of the outer belts 6). Hereby, it may also be provided to affix two or three adjacent rods 4 (twin rod, triple rod) to the two outer belts 6 only via one associated fixation. To that end, adjacent rods 4 are interconnected via tie bars and then merely one of the so interconnected rods 4 is affixed to the outer belts 6 on both sides so that the other rods 4 are also attached to the outer belts 6 via the tie bars. This has been described, for example, in the document U.S. Pat. No. 9,033,138 B2 which is hereby incorporated into the application in total by reference.

According to FIG. 2, additionally, two inner belts 7 are provided which serve, due to the width of the pick-up web 2 or, respectively, the rods 4, to additionally stabilize the rods 4. The rods 4 can be affixed to the inner belts 7 in a similar manner as to the outer belts 6, i.e. as individual rods, in a twin rod or in a triple rod configuration each via rivets or similar fastening means (indicated by a dotted line for one of the inner belts 7).

Furthermore, according to FIGS. 2 and 3, several tappets 8 of the length L are provided that project approximately perpendicular from the transport surface 5 and are spaced apart equally, across the entire circumference of the belts 6, 7, at a pre-defined tappet spacing A8 thereby creating a defined tappet graduation. The tappets 8 are also affixed to the belts 6, 7 are, thus, are also driven by them in an endless circulating manner. Hereby, the tappet spacing A8 or, respectively, the tappet graduation is adapted to the rods spacing A2 or, respectively, the rod graduation in such a way that each tappet 8 covers or replaces a defined number of rods 4 and the rod graduation can be maintained across the entire circumference of the pick-up web 2. Thereby, the sieve surface S is utilized as optimally as possible.

To that end, each tappet 8 is constructed as shown in FIGS. 3 and 4. Thus, an single or, respectively, one-piece basic corpus 9 having a width B adapted to the rod spacing A2 is provided, into which metal sweeping teeth 10 and a metal fixing bracket 11 are embedded, whereby the fixing bracket 11 acts as a tappets fortification 20 in the area of fixation. The sweeping teeth 10 are distributed, across the entire length L of the tappets 8, at a tooth spacing A10 from each other and, hereby, aligned so as to project perpendicular from the transport surface 5. The fixing bracket 11 extends across the entire length L of the tappets 8 and a bar 11*a* thereof protrudes into the basic corpus 9. A mounting flange 11*b* of the fixing bracket 11 is flush with the basic corpus 9 on a contact surface 12 of the tappet 8.

Hereby, the contact surface 12 serves to establish a connection between the tappet 8 and the endless belts 6, 7, whereby, to that end, several holes 14 are arranged in a lower flange 13 of the tappet 8 the positions of which correspond to the belts 6, 7 and which penetrate the basic corpus 9 and also the fixing flange 11*b* of the fixing bracket 11. Through the holes 9 a suitable fastening means 17, e.g. a rivet or a screw, can be introduced by means of which the tappet 8, with the help of the tappet fortification 20, can be securely affixed to the belts 6, 7.

Furthermore, the basic corpus 9 with a posterior flange 15 projecting perpendicular from the transport surface 5 projects beyond the sweeping teeth 10 so that the posterior flange 15 creates a sweeping section 15*a* which is segmented by evenly distributed gashes 16. The basic corpus 9 overall is made of a polymer, preferably rubber, whereby individual, stressed areas may also be reinforced. For example, the sweeping section 15*a* or, respectively, the posterior flange 15 of the one-piece basic corpus 9 may be fiber layer reinforced or structurally reinforced in any other way.

By virtue of the one-piece shape of the basic corpus 9 the weight can be reduced because the individual elements of the tappet 8 no longer need to be screwed together layer by layer. Moreover, debris cannot accumulate in gaps of the tappet 8, and this can be, advantageously, furthered by rounded edges. Furthermore, the one-piece construction allows the width B of a tappet 8 to be adapted more precisely to the rod spacing A2 and, therewith, the rod graduation of the rods 4 so that an optimized area of the rods 4 and, therewith, the sieve surface S is covered.

The invention claimed is:

1. Pick-up web (2) for an agricultural machine, in particular, a nut harvester (1), for picking up and transporting nut fruit (N) along a conveyor device (F), comprising at least:
    at least two endless circulating belts (6, 7) for driving said pick-up web (2),
    several rods (4) extending perpendicular to the direction of transport (F) of said pick-up web (2) and between said endless circulating belts (6, 7), said rods (4) being arranged at a rod spacing (A4) in relation to each other and creating a sieve-type transport surface (5) for transporting and cleaning the nut fruit (N), as well as
    several tappets (8) projecting perpendicularly away from said transport surface (5), each tappet (8) being connected to said at least two endless circulating belts (6, 7) and comprising several sweeping teeth (10) distributed across a length (L) of said tappet (8) as well as a sweeping section (15, 15*a*) each projecting perpendicularly away from said transport surface (5), each tappet (8) comprises a one-piece basic corpus (9) extending across the length (L) of a tappet (8) and into which said sweeping teeth (10) and a tappet fortification (20, 11) are being embedded, at least in part, whereby said one-piece basic corpus (9) is affixed via a mounting flange (11*b*) of said tappet fortification (20, 11) to said at least two belts (6, 7) and a posterior edge (15) of said basic corpus (9) projects beyond said sweeping teeth (10) as a sweeping section (15*a*).

2. Pick-up web (2) according to claim 1, said rods (4) are arranged individually or in groups, in particular, in pairs or in groups of three, always at the rod spacing (A4) in relation to each other, between said at least two belts (6, 7).

3. Pick-up web (2) according to claim 2, said rods (4) are affixed, individually or in groups, to said at least two belts (6, 7) via fastening means.

4. Pick-up web (2) according to one of the above claims, at least two outer belts (6) are provided between which said rods (4) and said tappets (8) are arranged.

5. Pick-up web (2) according to claim 4, further, at least one endless circulating inner belt (7) is arranged between said at least two outer belts (6) in a certain graduation, whereby said rods (4) and/or said tappets (8) are affixed to said inner belt (7).

6. Pick-up web (2) according to one of the above claims, said tappet fortification (20) embedded in said basic corpus (9) is designed as a fixing bracket (11), said fixing bracket (11) comprising a bar (11*a*) protruding into said basic corpus (9) and a mounting flange (11*b*), said mounting flange (11*b*) being flush with a contact surface (12) of said tappet (8), said tappet (8) being in contact with said contact surface (12) at said at least two belts (6, 7).

7. Pick-up web (2) according to claim 6, said tappet (8) comprises several holes (14) penetrating at least said mounting flange (11*b*), said tappet (8) being affixed to said at least two belts (6, 7) via fastening means (17) introduced in said holes (14).

8. Pick-up web (2) according to one of the above claims, the posterior flange (15*a*) of said basic corpus (9) is gashed in segments as a sweeping section (15*a*).

9. Pick-up web (2) according to one of the above claims, said basic corpus (9) consists of a polymer, preferably rubber.

10. Pick-up web (2) according to one of the above claims, the posterior flange (15*a*) of said basic corpus (9) as sweeping section (15*a*) is fiber-reinforced.

11. Pick-up web (2) according to one of the above claims, said tappets reinforcement (20) embedded in said basic corpus (9) and/or said sweeping teeth (10) embedded in said basic corpus (9) are made of metal.

* * * * *